United States Patent
Maes et al.

(10) Patent No.: US 11,265,083 B2
(45) Date of Patent: Mar. 1, 2022

(54) APPARATUS AND METHOD FOR SIGNAL MODULATION IN A POINT-TO-MULTIPOINT OPTICAL NETWORK

(71) Applicant: Nokia Solutions and Networks Oy, Espoo (FI)

(72) Inventors: Jochen Maes, Antwerp (BE); Robert Borkowski, Ludwigsburg (DE); Rene Bonk, Pforzheim (DE)

(*) Notice: Subject to any disclaimer, the term of this patent is extended or adjusted under 35 U.S.C. 154(b) by 0 days.

(21) Appl. No.: 17/136,809

(22) Filed: Dec. 29, 2020

(65) Prior Publication Data
US 2021/0250100 A1    Aug. 12, 2021

(30) Foreign Application Priority Data
Feb. 7, 2020 (EP) .................................... 20156196

(51) Int. Cl.
 | | |
 |---|---|
 | *H04B 10/516* | (2013.01) |
 | *H04B 10/61* | (2013.01) |
 | *H04L 25/03* | (2006.01) |

(52) U.S. Cl.
CPC ........... *H04B 10/516* (2013.01); *H04B 10/61* (2013.01); *H04L 25/03019* (2013.01)

(58) Field of Classification Search
CPC .. H04B 10/516; H04B 10/61; H04L 25/03019
USPC ........................................................ 398/159
See application file for complete search history.

(56) References Cited

U.S. PATENT DOCUMENTS

| | | | |
|---|---|---|---|
| 2003/0147646 A1* | 8/2003 | Zitelli | H04B 10/541 |
| | | | 398/65 |
| 2003/0198478 A1 | 10/2003 | Vrazel et al. | |
| 2005/0111854 A1 | 5/2005 | Miyazaki | |
| 2018/0234185 A1* | 8/2018 | Ferreira | H04B 10/2572 |
| 2019/0288777 A1* | 9/2019 | Ishimura | H04J 14/0245 |
| 2021/0013971 A1* | 1/2021 | Hara | H04L 25/49 |

FOREIGN PATENT DOCUMENTS

| | | |
|---|---|---|
| JP | 2010199638 A | 9/2010 |
| WO | WO-2019/159891 A1 | 8/2019 |

OTHER PUBLICATIONS

European Search Report for European Application No. 20156196 dated Aug. 5, 2020.

* cited by examiner

*Primary Examiner* — Dalzid E Singh
(74) *Attorney, Agent, or Firm* — Harness, Dickey & Pierce, P.L.C.

(57) ABSTRACT

An apparatus for signal modulation in a point-to-multipoint optical network is configured to modulate a single-wavelength carrier wave before distribution towards optical receivers of a first type adapted for intensity detection and a second type adapted for optical field detection. The apparatus includes a first module configured to modulate the carrier wave by varying the intensity of the carrier wave to represent data intended for the first type of receivers, and by controlling the phase and/or polarization of the carrier wave during selected periods. The apparatus includes a second module configured to modulate the carrier wave by varying the phase and/or polarization of the carrier wave to represent data intended for the second type of receivers, and by varying the intensity of the carrier wave during selected periods.

15 Claims, 11 Drawing Sheets

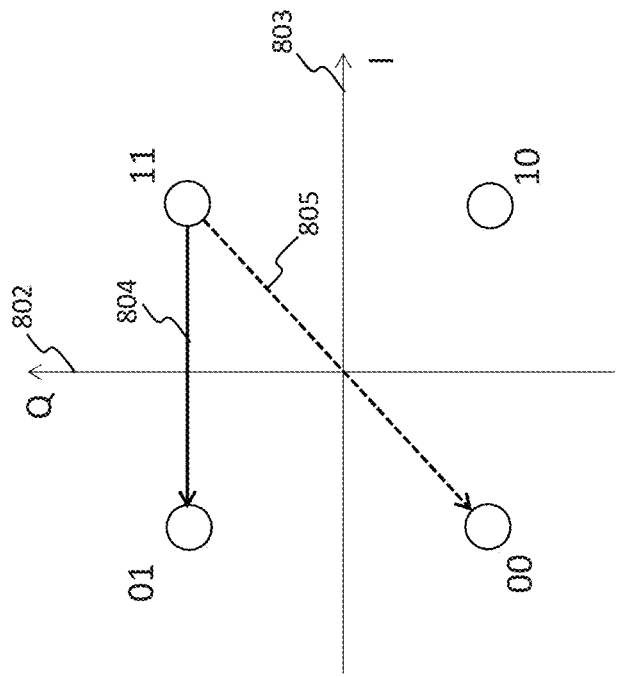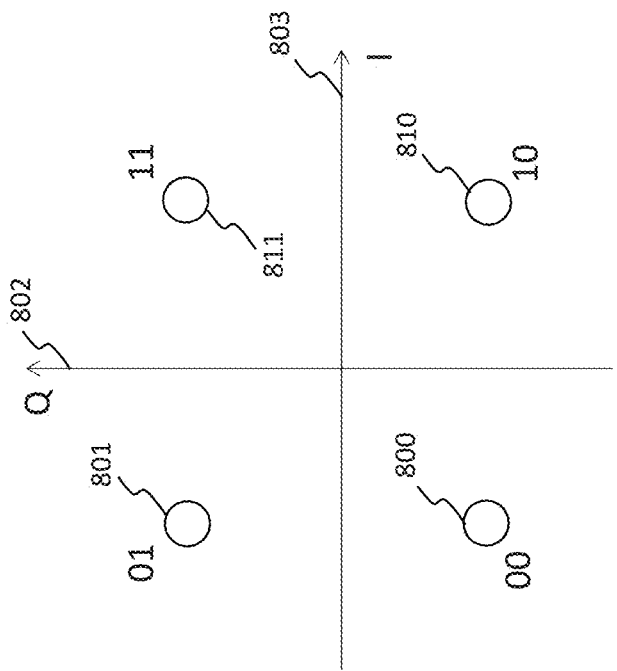
Fig. 8

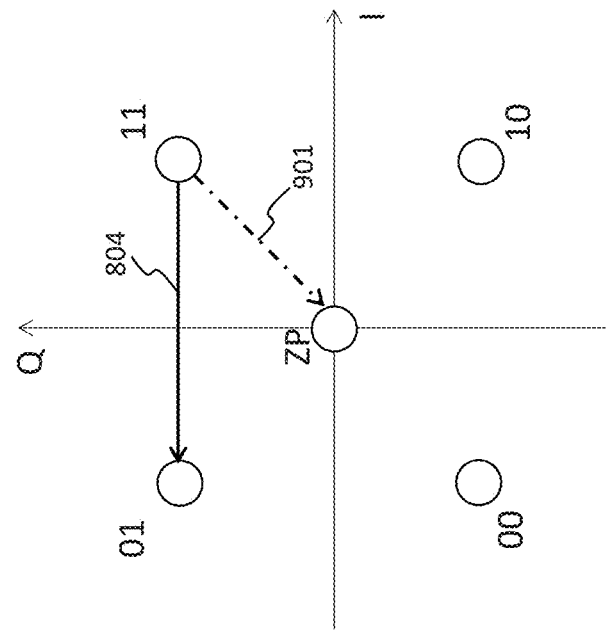
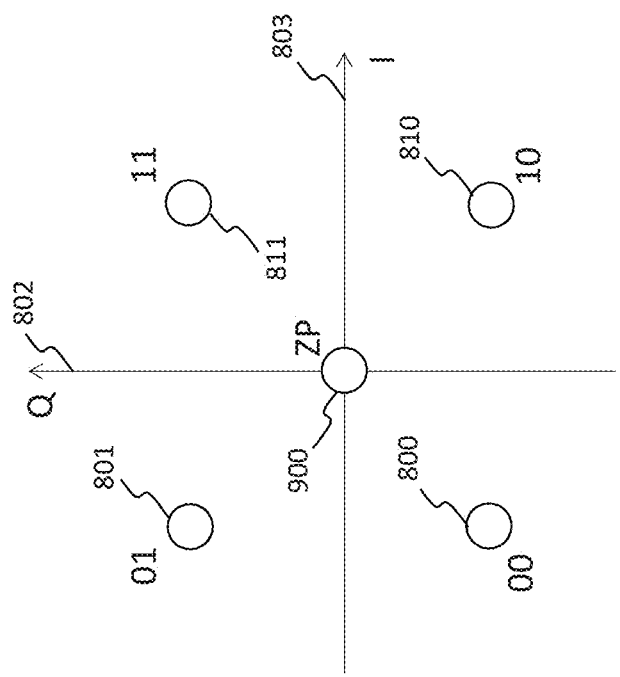
Fig. 9

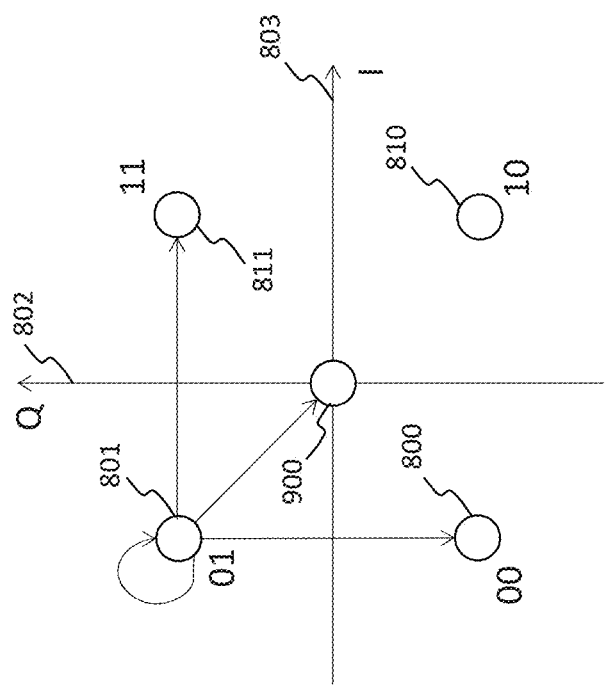

APPARATUS AND METHOD FOR SIGNAL MODULATION IN A POINT-TO-MULTIPOINT OPTICAL NETWORK

CROSS-REFERENCE TO RELATED APPLICATIONS

The present application claims priority under 35 U.S.C. § 119 to European Patent Application No. 20156196.6, filed on Feb. 7, 2020, in the European Patent Office, the entire contents of each of which are hereby incorporated by reference.

TECHNICAL FIELD

Various example embodiments relate, amongst others, to an apparatus and method for signal modulation in a point-to-multipoint optical network.

BACKGROUND

In fiber-optic communication light forms an electromagnetic carrier wave that is modulated to carry information. Different types of modulation techniques exist. Intensity Modulation (IM) uses the intensity of a light beam to encode information, by varying the optical power output. A simple variant is on-off keying (OOK), where the presence or absence of a carrier wave is used to represent digital data. An Intensity Modulation (IM) at the transmitter side is generally combined with a Direct Detection (DD) at the receiver side, meaning that the receiver only responds to changes in the receiving signal power. This is also referred to as Non-Return-to-Zero (NRZ) modulation. In coherent modulation technology, the phase of a carrier wave is modulated. A specific optical receiver is required, which allows for coherent detection, meaning that the phase of an optical signal can be recovered and any phase information carried by a transmitted signal can be extracted. Adding a polarization modulation provides an additional degree of freedom for modulating the carrier wave. By varying a wave parameter like the intensity, phase, polarization, or a combination thereof, different states of the carrier wave are obtained, each of them representing a symbol. For example, using four different phases in a phase modulation allows to represent four different symbols of two bits each, while a simple on-off keying only allows for two different symbols of one bit each.

A Passive Optical Network (PON) implements a point-to-multipoint architecture, wherein unpowered optical splitters are used to take input from a single optical fiber and broadcast it to many Optical Network Units (ONUs) at the end-user side. A conventional PON currently uses Intensity Modulation (IM), generally a simple on-off keying, at the transmitter side, and Direct Detection (DD) at the receiver side. Such traditional IM-DD methods allow for a data rate of about 50 Gbps on a single wavelength over a typical 29 dB optical path loss (so-called N1 class) if exploiting spectrum in the Original band (O-band).

SUMMARY

When data rates of 100 Gbps per wavelength or higher are required over an optical path loss typical for PON, a traditional IM-DD method no longer suffices. Increasing the data rate cannot simply be done by exploiting more than one wavelength of 50 Gbps each through Wavelength Division Multiplexing (WDM), as the spectrum in the O-band is already densely occupied, the currently installed low-cost receivers don't allow for the required wavelength separation, and detrimental nonlinear physical effects such as four-wave-mixing would arise in the O-band. Also the use of coherent technology, which would allow for a higher date rate without increasing the symbol rate, cannot simply be applied in practice. Indeed, either the coherent technology needs to use a separate wavelength, suffering from the spectrum scarcity as mentioned before, or all legacy technology needs to be replaced. The latter implies replacement of the already-installed ONUs by high-cost coherent receivers, a cost of which is added for each individual customer, also for those not desiring a higher service tier.

At present, there is no satisfying solution to increase the data rate in a PON.

Amongst others, it is therefore an object to disclose embodiments of an apparatus, which allows to increase the data rate in a PON using a single wavelength, without replacing all legacy DD ONUs.

This object is achieved, according to a first example aspect of the present disclosure, by an apparatus for signal modulation in a point-to-multipoint optical network as defined by claim 1, the apparatus being configured to modulate a single-wavelength carrier wave before distribution towards optical receivers of a first type adapted for intensity detection and a second type adapted for optical field detection, the apparatus comprising:

a first module configured to modulate the carrier wave by varying the intensity of the carrier wave, thereby representing data intended for the first type of receivers, and by controlling the phase and/or polarization of the carrier wave during selected periods;

a second module configured to modulate the carrier wave by varying the phase and/or polarization of the carrier wave, thereby representing data intended for the second type of receivers, and by varying the intensity of the carrier wave during selected periods.

Thus, example embodiments of the disclosure concern an apparatus for signal modulation in a point-to-multipoint optical network. An optical network is typically a fiber network across which data is transmitted by light signals. A point-to-multipoint optical network refers to an architecture where a single optical headend serves multiple endpoints and one optical signal is broadcasted to many end-users. For example, it is a Passive Optical Network (PON), in which no powered electronic components are used for the signal distribution throughout the network. Typically, a PON comprises an Optical Line Termination (OLT) placed at the server provider's central office, and multiple Optical Network Units (ONUs) or Optical Network Terminals (ONTs) near the end-users. An unpowered optical splitter is then used to distribute input received from the OLT towards the connected ONUs or ONTs.

In an optical network, the light forms an electromagnetic carrier wave that is modulated to carry information. Typically, a transmitter, e.g. installed at an OLT, comprises a light source, e.g. a laser source, and an optical modulator. An optical modulator comprises the necessary hardware and software to modulate the wave received from the light source, i.e. to change physical parameters of the carrier wave in accordance to data that has to be encoded. For example, an OLT may comprise a digital-to-analog converter to convert digital data into electrical signals, where the latter are used as an input by the optical modulator to control its modulation. An apparatus for signal modulation refers to an apparatus that during operation receives a carrier wave from a light source and some input representing the data to be encoded, and generates a modulated carrier wave. The apparatus may be a subsystem of a transmitter or an OLT.

The apparatus is configured to modulate a single-wavelength carrier wave before distribution towards optical receivers. This implies that the carrier wave which is received and modulated by the apparatus, is a single carrier wave operating at a specific wavelength. For example, the carrier wave operates at a wavelength within the Original band (O-band). It does not mean, however, that the transmitter where the apparatus may be part of is restricted to single-wavelength transmitters only. It is also understood that the carrier wave has finite line width, and that the modulating results in a signal that occupies a bandwidth around the carrier wave.

The apparatus is configured to modulate the carrier wave before distribution towards optical receivers. For example, the apparatus is comprised in an OLT, and the OLT comprises the needed components to transmit the optical signal after modulation by the apparatus. An optical receiver is defined as a device that is adapted to receive the modulated optical signal, and to recover it as an electrical signal for extracting the encoded information. For example, an optical receiver may be comprised in an ONU, which converts the received optical signals to electrical signals and then send these electrical signals to the end-user's premises. In another example, an optical receiver may be comprised in an ONT, the latter being in essence the same as an ONU but generally located on customer premises.

Multiple optical receivers are present in the point-to-multipoint optical network. Amongst these optical receivers at least two different types of receivers are present, namely a first type and a second type. The first type of receivers is adapted for intensity detection. Intensity detection may also be referred to as direct detection or power detection, and refers to the ability to detect variations in the optical power, intensity or amplitude of the received modulated signal. For example, a first type receiver comprises a photodetector or photosensor which responds to changes in the receiving signal optical power. As generally no clock signal is transmitted with the data, the receiver typically also comprises a component adapted for Clock and Data Recovery (CDR). Clock Recovery refers to the process of extracting timing information from the received signal, in order to regenerate the clock at the receiver. In an optical receiver adapted for intensity detection, the CDR component may continuously measure transitions in the received signal, and use this information to control the phase of the recovered clock. Having recovered the clock, the CDR converges to a locked condition and may sample the incoming signal through its Data Recovery component. Various implementation options exist for CDR, such as high-speed analog circuitry performing early-late phase detection or a blind or phase-tracking Analog-to-Digital Conversion (ADC) based digital CDR.

The second type of optical receivers is adapted for optical field detection. Optical field detection, also referred to as coherent detection, refers to the capability of recovering the optical field propagating through the fiber, rather than detecting its power only. This implies that an optical receiver of the second type is adapted to detect changes in the phase and/or the polarization of the modulated optical signal. An optical receiver adapted for optical field recovery typically comprises an equalizer component, as field recovery enables the digital compensation of fiber dispersion. Typically, an equalizer component implements an equalization algorithm or filter that allows to reverse the distortion, e.g. different types of dispersion, incurred by a signal transmitted through a channel. E.g., an adaptive equalization may be used, wherein changes in the channel are learned from the received signal and equalization parameters are updated correspondingly. In contrast, equalization with intensity detection can only partly reverse distortion due to the nonlinear effects typically induced through power detection.

The apparatus comprises a first module and a second module. The first module is adapted to modulate the carrier wave according to a first modulation scheme, and the second module is adapted to modulate the carrier wave according to a second modulation scheme. This implies that during operation the apparatus modulates a carrier wave, using either the first modulation scheme or the second modulation scheme. In other words, the apparatus comprises some part, e.g. hardware or software, that corresponds to the first module, and another part, e.g. hardware or software, that corresponds to the second module. In an embodiment, the first and second module may be software modules, being configured to generate control data, where the latter is used as an input by an optical modulator after a digital-to-analog conversion. For example, the two modules may comprise different sub-routines related to two states in a state diagram. In another embodiment, the first and second module may comprise an optical modulator themselves, thereby being adapted to generate a modulated carrier wave.

The first module is configured to modulate the carrier wave by varying the intensity of the carrier wave, thereby representing data intended for the first type of receivers, and by controlling the phase and/or polarization of the carrier wave during selected periods. This implies that the first module is adapted to apply two kind of variations to the optical carrier wave.

Firstly, the first module is adapted to vary the intensity of the carrier wave, where these intensity variations are applied in accordance with data intended for the first type of receivers. This means that data which is intended for an end-user having an optical receiver of the first type, is encoded into the modulated signal by means of an intensity modulation. Varying the intensity may refer to varying the power and/or the amplitude of the optical signal. In an embodiment, varying the intensity may be implemented through an on-off modulation, in which only the presence or absence of the signal is varied. In practical implementations, some remnant power may be still transmitted in the off-state, proportional to the extinction ratio of the laser transmitter. In another embodiment, varying the intensity may be done by applying multiple power levels in the modulated optical signal.

Secondly, the first module is adapted to control the phase and/or polarization of the carrier wave during selected periods. For example, the intensity modulated signal as described in the previous paragraph, is further modified by varying its phase and/or polarization. Alternatively, the phase and/or polarization is controlled such that it is kept static, rather than exhibiting non-deterministic behaviour. In an embodiment, an on-off modulation may be used to obtain the intensity modulated signal, and afterwards the phase and/or polarization may be varied during periods in which the signal is present. In another embodiment, different power levels may be applied in the intensity modulated signal, and afterwards the phase and/or polarization may be varied during periods in which a specific power level applies. The controlling of the phase and/or modulation is applied during selected periods, which may e.g. refer to periods of a specific power level, periods in which the signal is present, specific periods in time, etc. In an embodiment, variations in the phase and/or polarization may be applied according to a predefined pattern, e.g. on every symbol represented in the intensity modulated signal another phase condition is applied. In another embodiment, the variations in the phase and/or polarization may be applied according to data to be encoded, e.g. data intended for receivers of the second type may be represented by the phase modulations. Moreover, different embodiments are possible concerning the order in which the intensity variations on the one hand and phase and/or polarization variations on the other hand are applied to the signal, e.g. first intensity modulations may be applied followed by phase and/or polarization modulations or vice versa, they may be applied in parallel, etc.

The advantage of the first module is that receivers of the first type, adapted for intensity detection, may detect and demodulate the received signal as usual, while receivers of the second type can meanwhile keep their equalizer on track. Indeed, when during operation the optical signal is modulated using the first module, the modulated signal is received by every optical receiver. An optical receiver of the first type will detect the intensity variations in the modulated signal, allowing to decode the transferred information. Therefore, traditional types of optical receivers, e.g. DD ONUs, may still be used, and no replacement of legacy already-installed ONUs of the first type is required for those clients not willing to upgrade to a higher service tier. On the other hand, an optical receiver of the second type may use the received signal to update its equalizer. Indeed, as the modulated signal has a controlled phase and/or polarization, this information may be used by an adaptive equalization algorithm to continuously or regularly update the equalization parameters. It is beneficial for the receiver to know the controlled phase and/or modulation, such that it can update based on known training data rather than through decision directed feedback. Through equalization, changes in the channel, e.g. due to temperature or environmental variations, are continuously detected, and the equalizer is up-to-date whenever data intended for a receiver of the second type is transferred again. This avoids inefficiencies due to additional training cycles and contributes to an accurate decoding for receivers of the second type.

The second module is configured to modulate the carrier wave by varying the phase and/or polarization of the carrier wave, thereby representing data intended for the second type of receivers, and by varying the intensity of the carrier wave during selected periods. This implies that the second module is adapted to apply two kinds of variations to the optical carrier wave.

Firstly, the second module is adapted to vary the phase and/or polarization of the carrier wave, where these variations are applied in accordance with data intended for the second type of receivers. This means that data which is intended for an end-user having an optical receiver of the second type, is encoded into the modulated signal by means of phase and/or polarization variations. Optionally, amplitude variations may be applied in addition to the phase and/or polarization variations. For example, a Quadrature Phase Shift Keying (QPSK) may be applied for encoding the data into the signal, or any other modulation method implementing phase and/or polarization variations.

Secondly, the second module is adapted to vary the intensity of the carrier wave during selected periods. For example, the phase and/or polarization modulated signal as described in the previous paragraph, is further modified by applying changes in its intensity, e.g. its power or amplitude. The variations in the intensity are applied during selected periods, implying that various embodiments exist to apply the intensity variations. In an embodiment, different power levels may be used in the phase and/or polarization modulated signal. In another embodiment, periods of zero power may be introduced into the signal. In an embodiment, periods of zero power may be introduced periodically, at a constant or variable rate. In another embodiment, zero power periods may be introduced according to data to be encoded, i.e. the zero power periods are introduced depending on the data content to be transferred to the second type of receiver. Moreover, different embodiments are possible concerning the order in which the phase and/or polarization variations on the one hand and intensity variations on the other hand are applied to the signal, e.g. first phase and/or polarization modulations may be applied followed by intensity modulations or vice versa, they may be applied in parallel, etc.

The advantage of the second module is that receivers of the second type may be used, leading to an increased capacity, while receivers of the first type can meanwhile keep their CDR locked. Indeed, when during operation the optical signal is modulated using the second module, the modulated signal is received by every optical receiver. An optical receiver of the second type will decode information from the modulated phase and/or polarization variations. As coherent technology allows to encode more bits within a symbol, the ability to use receivers of the second type contributes to a higher data rate compared to a traditional PON. On the other hand, an optical receiver of the first type may use the received signal to guarantee that his CDR stays locked. Indeed, as intensity variations are introduced in the modulated signal, a CDR may use these transitions to phase-align the clock, and therefore remain in a locked condition. This implies that a CDR will be in a locked condition whenever data intended for a receiver of the first type is transferred again. As such, data extraction may start immediately, thereby avoiding any inefficiencies due to large locking times.

When data needs to be transferred that is intended for one or more end-users, the apparatus may receive information concerning the type of receivers installed at those endpoints. Based on this type information, the apparatus may select either the first or the second module to modulate the optical carrier wave. For example, if only data intended for the second type of receivers needs to be transferred, then the apparatus may use the second module to modulate the carrier wave. In such periods of time, the system capacity increases to the capacity imposed by the coherent technology. In another example, if only data intended for the first type of receivers need to be transferred, then the apparatus may use the first module to modulate the carrier wave, leading to an unchanged capacity compared to a traditional PON using IM-DD. In yet another example, if data intended for both the first and second type of receivers needs to be transferred, the first and the second module may be used in an alternating way. Or, in another embodiment, if data intended for both the first and second type of receivers needs to be transferred, only the first module may be used, if the phase and/or polarization variations in the signal are used to encode data intended for receivers of the second type. The latter allows to obtain a system capacity being higher than in a traditional PON.

To conclude, the apparatus for signal modulation allows for a co-existence of high-tier coherent receivers and traditional low-cost DD receivers on the same wavelength. This has various advantages. First, it is not required to replace all legacy already-installed receivers, which implies that customers not willing to upgrade to a higher service tier do not have to contribute in a replacement cost. Secondly, coherent receivers may be used within the network, allowing for a capacity increase of the system, without being forced to free up a separate wavelength for this. Thirdly, modulation may be done for a single-wavelength carrier, thereby avoiding problems due to spectrum scarcity in the O-band and detrimental nonlinear physical effects such as those related to WDM.

In sample embodiments of the apparatus, as defined by claim 2, the first module is configured to modulate the carrier wave by controlling the phase and/or polarization during periods wherein the carrier wave is present. This implies that the first module is adapted to apply an intensity modulation for encoding data intended for optical receivers of the first type, such that periods occur wherein the intensity modulated signal is present and other periods in which the intensity modulated signal is absent. During the periods of presence, different power or amplitude levels may be modulated for encoding data intended for a receiver of the first type, or no power or amplitude variations may be modulated. Furthermore, during the periods of presence of the intensity modulated signal, the phase and/or polarization of the carrier wave is controlled. For example, the phase and/or polarization may be varied during presence of the intensity modulated signal. Controlling those phase and/or polarization modulations has the advantage that receivers of the second type can keep their equalizer on-track during periods of time where data intended for receivers of the first type is transferred.

In sample embodiments of the apparatus, as defined by claim 3, the first module is configured to vary the intensity of the carrier wave by means of an on-off modulation. This implies that the first module is adapted to encode data intended for receivers of the first type using an on-off modulation. In other words, the intensity modulated signal has periods in which the signal is present, and periods in which the signal is absent. For example, a binary 1 is represented by the signal being present, and a binary 0 is represented by the signal being absent. Furthermore, during periods of presence of the on-off modulated signal, the phase and/or polarization of the carrier wave is controlled, e.g. phase and/or polarization variations are applied. Controlling those phase and/or polarization modulations has the advantage that receivers of the second type can keep their equalizer on-track during periods of time where data intended for receivers of the first type is transferred.

In sample embodiments of the apparatus, as defined by claim 4, the first module is configured to modulate the carrier wave by controlling the phase and/or the polarization according to a predefined pattern. For example, given that each phase and/or polarization condition is defined by a constellation point, a deterministic cycling through the different possible constellation points may be applied. In an embodiment, one could modulate the phase and/or polarization according to a next constellation point every time the symbol changes in the intensity-modulated signal. For example, if a Quadrature Phase-Shift Keying is used and two polarizations, 16 different constellation points apply for the phase and polarization modulations. Thus, the same pattern of constellation points is repeated every 16 symbols. In another embodiment, one could change to another constellation point only on those symbols representing a binary one in the data intended for the first type of receivers. In yet another embodiment, a scrambling pattern may be applied, where phase modulation is applied pseudo-randomly, i.e. still deterministically but appearing random-like due to a much longer repetition cycle. The advantage of using a predefined pattern for the phase and/or polarization modulations, is that optimal control is obtained on how the frequency information is introduced in the modulated signal, and therefore receivers of the second type may be offered an ideal reference for keeping their equalizer up to date.

In sample embodiments of the apparatus, as defined by claim 5, the first module is configured to modulate the carrier wave by controlling the phase and/or the polarization, thereby representing data intended for the second type of receivers. This implies that on the one hand data intended for the first type of receivers is encoded, by means of an intensity modulation, and on the other hand data intended for the second type of receivers is encoded, by means of phase and/or polarization modulations. This has the advantage that data intended for a first type of receiver and data intended for a second type of receiver may be transferred simultaneously, thereby contributing to an increased system capacity.

In sample embodiments of the apparatus, as defined by claim 6, the second module is configured to vary the intensity of the carrier wave by introducing periods of zero power. Periods of zero power may refer to periods in which the modulated signal is not present. Zero-power refers to the intention of limiting the power to a level being close to zero; in practice there may be some very small residual power present. In an embodiment, data intended for the second type of receivers is encoded by means of a phase and/or polarization modulation, and periods of zero power are introduced in that phase and/or polarization modulated signal. In another embodiment, the zero-power level is inherent to the modulation format, i.e. the zero-power symbol is part of the constellation points defining the phase modulation scheme applied to encode the data intended for the second type of receivers. Introducing periods of zero power has the advantage that receivers of the first type may easily distinguish transitions between a zero-power period and another period, allowing such receivers to keep their CDR locked.

In sample embodiments of the apparatus, as defined by claim 7, the second module is configured to introduce the periods of zero power periodically, at a constant or variable rate. In an embodiment, zero-power symbols are periodically inserted at a constant rate, with an occurrence sufficient to ensure that the CDR of the first type of receivers remains locked. In another embodiment, the rate of inserting the zero-power symbols may be variable. For example, in periods of time being close to periods of time wherein data intended for the first type of receivers will be transferred, zero-power symbols may be inserted at a high rate to ensure the CDRs being locked sufficiently accurately by the time they need to extract data again. On the other hand, if no data will be transferred to the first type of receivers in the near future, a low rate of zero-power symbols may be used, thereby reaching a higher data rate towards the second type of receivers. In an embodiment, the periodicity in which zero-power periods are introduced may be selected proportional to the Consecutive Identical Digit (CID) immunity of the receivers of the first type. For example, XGS-PON (ITU recommendation G.9807.1) mandates a CID immunity of at least 72 bits or symbol periods. Introducing periods of zero power periodically has the advantage that an optimal control is obtained on how frequently they are introduced. This allows to make a trade-off between reaching an optimal system capacity, and ensuring that the CDRs stay locked.

In sample embodiments of the apparatus, as defined by claim 8, the second module is configured to introduce the periods of zero power, thereby representing data intended for the second type of receivers. This implies that data is modulated on the zero-power constellation points. In other words, apart from the phase and/or polarization variations in the modulated signal, also the periods of zero power are used to represent data intended for the second type of receivers. Various embodiments are possible, e.g. the zero-power constellation point may always represent the same bit value, the bit value corresponding to the zero-power constellation point may depend on the previous constellation point, etc. The advantage of modulating data on the zero-power constellation point is that every symbol in the modulated carrier wave is used to represent data intended for the second type of receivers. In this way, when the carrier wave is modulated by means of the second module, the full capacity inherent to the coherent technology is used, thereby contributing to an increased system capacity. At the same time, the availability of the zero-power periods in the modulated signal contributes to keeping the CDRs of the first type of receivers locked.

In sample embodiments of the apparatus, as defined by claim 9, the second module is configured to introduce the periods of zero power based on occurring transitions between intended symbols in the data intended for the second type of receivers. This implies that the second module is adapted to analyse the data intended for the second type of receivers, and to detect where a specific transition happens between intended symbols in this data. A symbol refers to one bit value or a sequence of more bit values. For example, in a modulation scheme with four constellation points a symbol may represent '00', '01', '10' or '11'. The second module is adapted to introduce a zero-power period each time a specific transition between intended symbols is present in the data. Thus, the decision where to introduce zero-power periods in the modulated signal is triggered by which data content is transferred to the second type of receivers, thereby having no full control on the rate of introducing zero-power periods. In an embodiment, additionally zero power periods may be introduced periodically, thereby increasing the control on the occurrence of zero power periods in the modulated signal. The advantage of introducing periods of zero power based on occurring transitions in the data is that the signal may be modulated in such a way that the power levels detected by the first type of receivers are similar to what the CDR normally expects to receive. This contributes in keeping the CDRs of the first type of receivers locked while data intended for the second type of receivers is transferred.

In sample embodiments of the apparatus, as defined by claim 10, the second module is configured to vary the phase and/or the polarization of the carrier wave based on a modulation scheme characterised by points in a constellation diagram, the periods of zero power representing an additional point in the constellation diagram, and the second module is configured to introduce the periods of zero power such that transitions between points in the constellation diagram avoid crossing the origin of the constellation diagram. For example, the phase of the signal may be modulated using a Quadrature Phase-Shift Keying (QPSK), characterised by four points in a constellation diagram, those four points representing the bit values '00', '01', '10', and '11'. Every constellation point lies in another quadrant of the constellation diagram. A transition between two constellation points in opposing quadrants, e.g. a transition between '00' and '11' or between '01' and '10' of a Gray mapped QPSK is a transition crossing the origin of the constellation diagram. The second module is configured to avoid such crossing through the origin, by modulating a zero-power period whenever the constellation point corresponding to the current bit value is in the opposite quadrant of the constellation point corresponding to the previous bit value. For example, if '00' followed by '11' needs to be modulated in the signal, the '00' is modulated according to the QPSK phase modulation, while the '11' is modulated by introducing a zero-power period. Avoiding transitions between constellation points crossing the origin, and instead encoding such transition by introducing a zero-power period, has the advantage that the modulated signal is made DD friendly. Indeed, a modulated signal is obtained in which a clear distinction is present between 'high' power on the one hand, and 'zero' power on the other hand, being optimal for phase-aligning the clock of the first type of receivers. In other words, the modulated signal avoids that power variations occur between a 'semi-high' level and a zero-power level, thereby avoiding false positive triggers for the CDR of the first type of receivers.

In sample embodiments of the apparatus, as defined by claim 11, the apparatus is configured to receive slot allocation information, representing the intended one or more receivers in a timeslot, and is configured to select the first or second module for modulating the carrier wave during the timeslot, based on the type of the one or more intended receivers in the timeslot. For example, a channel access method like TDMA (Time-Division Multiple Access) may be used for controlling when which data is transferred over the optical network. Typically, different timeslots are considered, which are executed sequentially. A timeslot may be allocated for transmitting data intended for (a) specific end-user(s). The apparatus is configured to receive this slot allocation information, i.e. for a specific timeslot the intended receiver of the data is known. Moreover, the apparatus has knowledge about the type of receivers being installed at the endpoints of the network. For example, such type information may be given to an OLT when an ONU starts up. For a specific timeslot, the apparatus is configured to verify the type of receiver being installed at the intended end-user, and based on this type to select either the first or the second module. This means that, depending on the type of the intended receiver, the apparatus will use the first or the second module to modulate the carrier wave within that timeslot. For example, if within a specific timeslot only data intended for the second type of receivers needs to be transferred, then the apparatus may use the second module to modulate the carrier wave. In another example, if only data intended for the first type of receivers need to be transferred, then the apparatus may use the first module to modulate the carrier wave. In yet another example, if data intended for both the first and second type of receivers needs to be transferred, the first module may be used, if the phase and/or polarization variations in the signal are used to encode data intended for receivers of the second type.

According to a second example aspect, as defined by claim 12, a system is disclosed, comprising:
  an apparatus according to the first example aspect;
  one or more optical receivers of the first type;
  one or more optical receivers of the second type;
  a point-to-multipoint optical network comprising optical fibres adapted for distribution of a modulated optical signal from the apparatus towards the optical receivers.

The apparatus, optical receivers of the first type, optical receivers of the second type and point-to-multipoint optical network are defined as in the previous paragraphs.

In sample embodiments of the system, as defined by claim 13, the optical receivers of the second type comprise an equalizer configured to reverse distortions incurred by the modulated optical signal due to fibre impairments, and the equalizer is configured to do an adaptive equalization of an optical signal modulated with the second module such that the adaptive equalization is not updated when the received power is below a selected threshold. An equalizer is defined as a device configured to reverse distortions, e.g. due to different types of dispersion, incurred by the modulated signal when being transmitted through the fiber channel. Typically, an equalizer implements a filter or equalization algorithm for this. An adaptive equalization refers to a continuous or regular analysis of the received signal in order to learn changes in the channel, e.g. due to temperature or environmental changes, and to a corresponding adaptation of equalization parameters or coefficients. The equalizer is configured such that, when an optical signal modulated by the apparatus with the second module is received, the adaptive equalization is not updated when the received power is below a selected threshold. For example, when a period of zero power was modulated into the signal by the second module, the equalizer will not be updated. This implies that a receiver of the second type needs a specific implementation in order to accommodate the modulation of zero-power periods in the signal. For example, in case a Constant Modulus Algorithm (CMA) is used for equalization in a QPSK receiver, the CMA will ensure that the received signal amplitude is equalized or normalized to the unit circle. In case zero-power periods are inserted, an unadapted CMA would lead to a biased estimator. Therefore, the CMA may be adapted to a Multi-Modus Algorithm (MMA), further characterized in that the equalizer is not updated in case the received power is below a threshold.

According to a third example aspect, as defined by claim 14, a method for signal modulation in a point-to-multipoint optical network is disclosed, comprising:
  providing optical receivers of a first type adapted for intensity detection and a second type adapted for optical field detection;
  providing an apparatus configured to modulate a single-wavelength carrier wave before distribution towards the optical receivers, the apparatus comprising a first module and a second module;
  modulating the carrier wave using the first module, comprising:
    varying the intensity of the carrier wave, thereby representing data intended for the first type of receivers, and
    controlling the phase and/or polarization of the carrier wave during selected periods;
  modulating the carrier wave using the second module, comprising:
    varying the phase and/or polarization of the carrier wave, thereby representing data intended for the second type of receivers, and
    varying the intensity of the carrier wave during selected periods.

According to a fourth example aspect, as defined by claim 15, a computer program product is disclosed, comprising computer-executable instructions for causing a device to perform at least the following:
  providing optical receivers of a first type adapted for intensity detection and a second type adapted for optical field detection;
  providing an apparatus configured to modulate a single-wavelength carrier wave before distribution towards the optical receivers, the apparatus comprising a first module and a second module;
  modulating the carrier wave using the first module, comprising:
    varying the intensity of the carrier wave, thereby representing data intended for the first type of receivers, and
    controlling the phase and/or polarization of the carrier wave during selected periods;
  modulating the carrier wave using the second module, comprising:
    varying the phase and/or polarization of the carrier wave, thereby representing data intended for the second type of receivers, and
    varying the intensity of the carrier wave during selected periods.

BRIEF DESCRIPTION OF THE DRAWINGS

Some example embodiments will now be described with reference to the accompanying drawings.

FIG. 8 shows a constellation diagram of a classical QPSK modulation scheme.

FIG. 9 and FIG. 10 show modified constellation diagram, in which an additional constellation point is added compared to the diagram of FIG. 8.

DETAILED DESCRIPTION OF EMBODIMENT(S)

Figure 1:
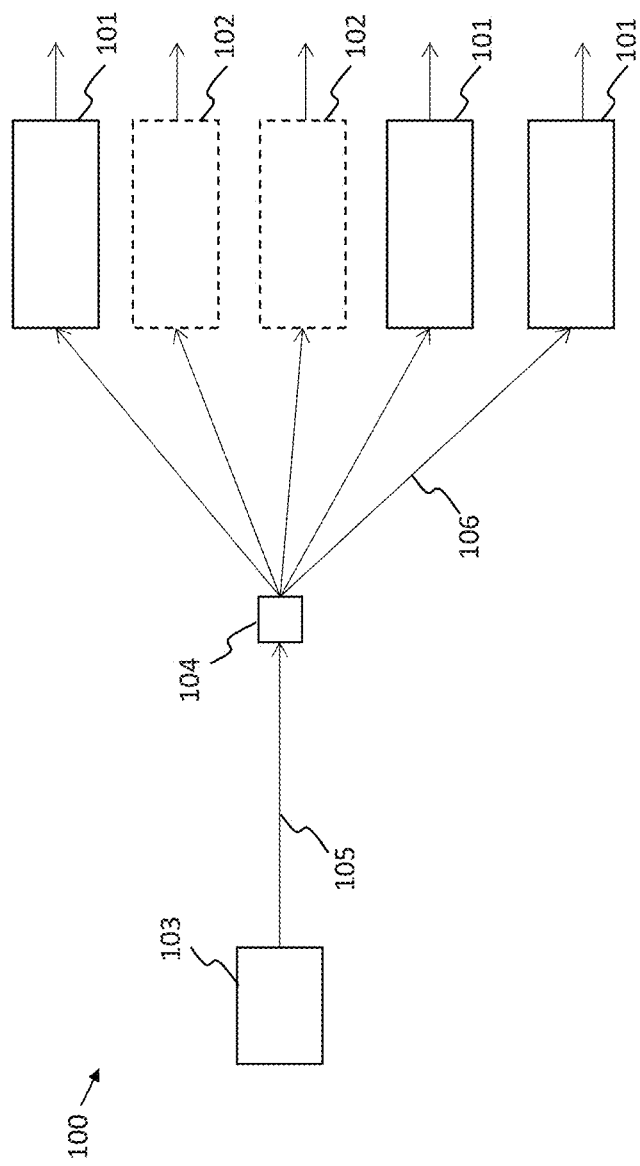
FIG. 1 illustrates a point-to-multipoint optical network.

FIG. 1 illustrates a point-to-multipoint optical network 100, for example a Passive Optical Network (PON), in which an optical signal may be transmitted through fiber connections 105, 106. The network 100 comprises an Optical Line Termination (OLT) 103 placed at the server provider's central office, and multiple Optical Network Units (ONUs) 101, 102. An unpowered optical splitter 104 allows to distribute input received from the OLT 103 towards the connected ONUs 101, 102. The figure illustrates that a single optical fiber 105 serves multiple endpoints 101, 102, such that one optical signal is broadcasted to every connected endpoint 101, 102.

FIG. 1 shows that two different types of receivers 101, 102 are present in the network 100. The first type of receivers 101 is adapted for intensity detection, also referred to as direct detection or power detection. A receiver of the first type 101 typically comprises a component adapted for Clock and Data Recovery (CDR). The second type of optical receivers 102 is adapted for optical field detection, also referred to as coherent detection, allowing to detect changes in the phase and/or the polarization of a modulated optical signal. An optical receiver of the second type 102 typically comprises an equalizer component, allowing for compensation of fiber dispersion.

Figure 2:
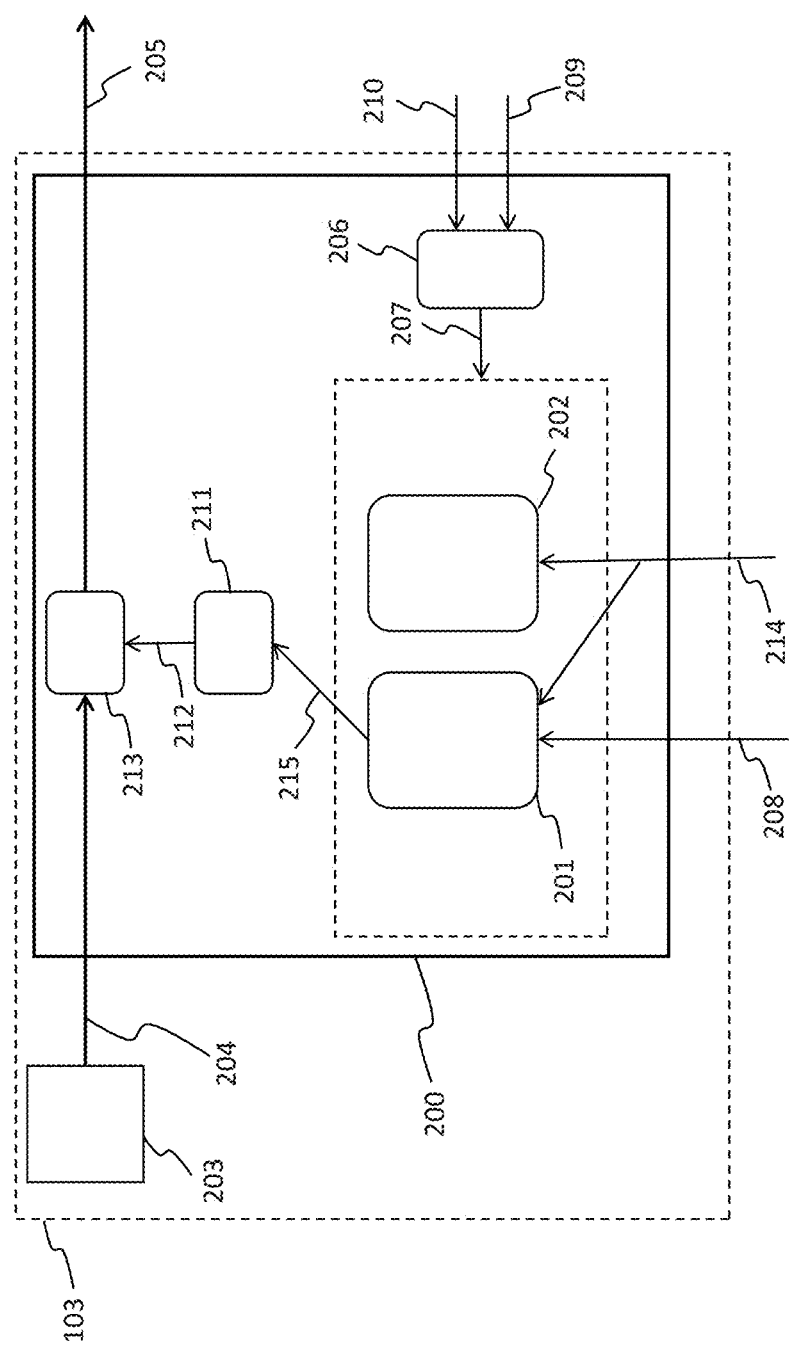
FIG. 2 gives a functional block scheme of an example embodiment of an apparatus for signal modulation in a point-to-multipoint optical network, and its integration within a transmitter device.

FIG. 2 gives a functional block scheme of an example embodiment of an apparatus 200 for optical signal modulation. The apparatus 200 is comprised in a transmitter device 103. For example, the transmitter device 103 is comprised in an OLT 103. The transmitter device 103 is adapted to transmit a modulated optical signal 205 towards the end-user side. The apparatus 200 is configured to modulate a single-wavelength carrier wave 204, and comprises a first module 201 and a second module 202. The apparatus 200 receives the carrier wave 204 from a light source 203, e.g. a laser source. The apparatus 200 is configured to modulate the carrier wave 204, by means of either the first module 201 or the second module 202. In FIG. 2, the situation is illustrated in which the first module 201 is used to modulate the carrier wave 204, resulting in a modulated signal 205.

The apparatus is configured to receive digital data 208 and 214 intended for the first and second type of receivers 101, 102 respectively. The apparatus 200 may further comprise one or more digital-to-analog converter(s) 211 to convert digital control data 215 generated by the first or second module 201, 202, into electrical signals 212, that are used to control a modulator 213. The modulator 213 may comprise distinct or integrated modules for modulating intensity, phase and/or polarization, such as an Electro-Absorption Modulator (EAM) for intensity modulation, an optical phase modulator for phase modulation and polarization splitter for enabling independent modulation of two orthogonal polarizations.

Furthermore, the apparatus 200 comprises a processing unit 206, configured to provide decision information 207 indicating which module 201, 202 is to be used for modulation. For this purpose, the apparatus 200 is configured to receive slot allocation information 209 and type information 210. The type information 210 indicates which type of optical receiver, either the first type 101 or the second type 102, is installed at each end-user. For example, when an optical receiver 101, 102 starts up, such type information is transmitted to the OLT 103. Typically, the digital data 208, 214, e.g. in the form of Internet packet information, comprises an ID of the intended receiver. The slot allocation information 209 represents the intended one or more receivers 101, 102 in a given timeslot. Based on the intended one or more receivers 101, 102 in a timeslot, and the type information 210, the decision information 207 is determined, indicating which module 201 or 202 is to be used for modulating the carrier wave 204 in the given timeslot. The processing unit 206 may be part of a state machine in an OLT. The data 208 and 214 may be organized in a single data queue, or in separate data queues. In the latter case, the apparatus 200 requests the right amount of data from the appropriate queues based on information 209, 210, for example through a backpressure mechanism, and may further comprise a shallow input buffer. The information 209, 210 may be determined by appropriate protocols for maintaining quality of service, including queue management and traffic shaping.

Figure 3:
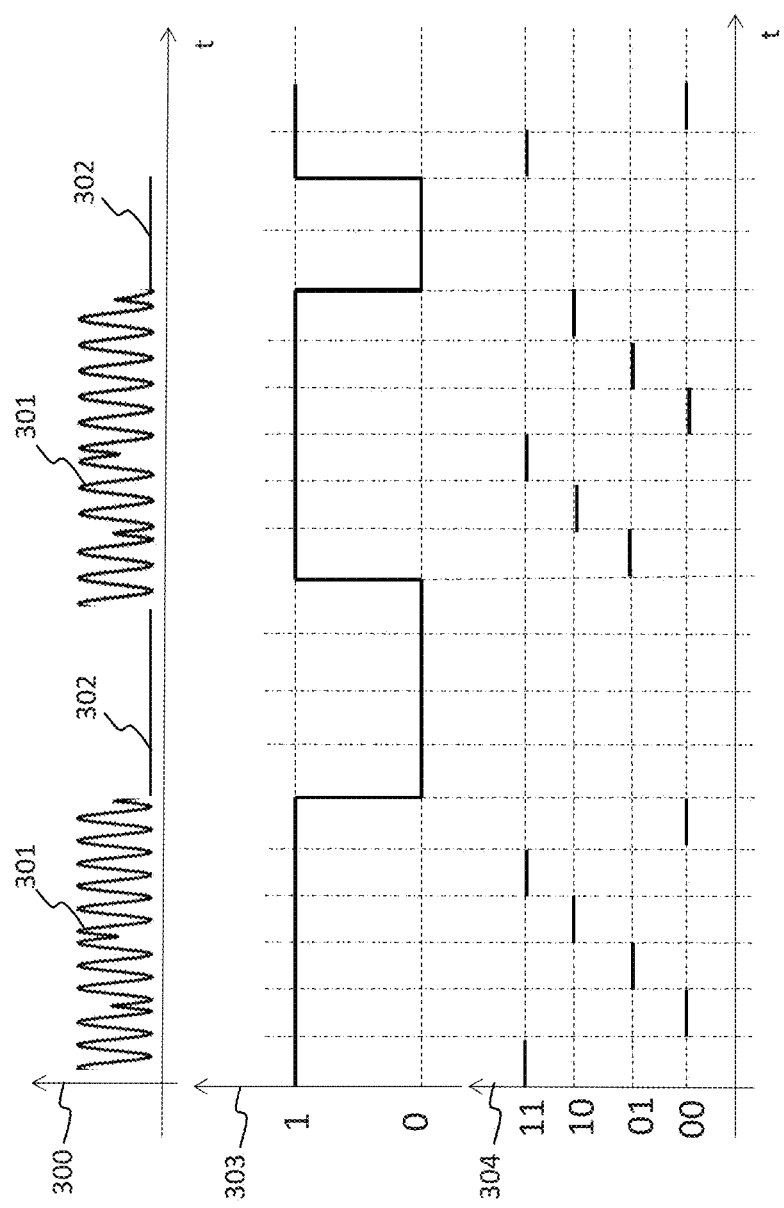
FIG. 3 and FIG. 4 each schematically illustrate a modulation scheme implemented by a first module of an example embodiment of an apparatus for signal modulation in a point-to-multipoint optical network.

FIG. 3 schematically illustrates a modulation scheme implemented by the first module 201, according to a first example embodiment of the apparatus 200. FIG. 3 shows the time evolution of a modulated optical signal 300, encoded information 303 for optical receivers of the first type 101, and encoded information 304 for optical receivers of the second type 102. A period of time is represented in which data intended for receivers of the first type 101 is transferred over the optical network 100.

In the example embodiment of FIG. 3, the data intended for receivers of the first type 101 is encoded into the optical carrier wave by means of an NRZ-OOK modulation (Non-Return-to-Zero On-Off Keying). The figure shows that the modulated signal 300 comprises periods of time in which the signal is present, see 301, and periods of time in which no signal is present, see 302. During operation, an optical receiver of the first type 101, adapted for intensity detection, will receive the modulated signal 300 and decode the transferred digital data, see the bit values illustrated in 303. In FIG. 3, a period in which the signal 301 is present represents a binary '1', and a period in which no signal is present represents a binary '0'. Such a data extraction may be done by traditional optical receivers of the first type 101, e.g. DD ONUs, such that no replacement of legacy already-installed ONUs of the first type is required.

Furthermore, the example embodiment of FIG. 3 shows that during the periods of time where a modulated signal 300 is present, the phase of the signal is modulated. In the example of FIG. 3, four different phase conditions may be applied to the carrier wave, such that four different symbols may be represented by means of the phase modulations. Each symbol corresponds to a two-bit value, namely '00', '01', '10' or '11', as is illustrated in the information 304. In the example embodiment of FIG. 3, the phase modulations are applied in a deterministic way, according to a predefined pattern. The figure shows that the same pattern of four symbols is repeated.

As an optical receiver of the second type 102 is a coherent detector, it is adapted to detect phase modulations in the modulated signal 300. A receiver of the second type 102 receiving the modulated signal 300 will not use it to decode data from it, as the transferred data currently is intended for receivers of the first type 101. However, the phase variations available in the modulated signal 300 allow receivers of the second type 102 to keep their equalizer updated. Indeed, the available frequency information may be used by an adaptive equalization algorithm to continuously or regularly update the equalization parameters. In this way, changes in the channel, e.g. due to temperature or environmental variations, are continuously detected, and the equalizer is up-to-date whenever data intended for a receiver of the second type 102 is transferred again. On the other hand, for a receiver of the first type 101, the coherently modulated binary 'one' still looks sufficiently like an NRZ-OOK binary 'one'.

In the example illustrated in FIG. 3, only phase modulations are applied during presence of the signal. However, other example embodiments are possible, in which the polarization of the carrier wave is modulated during signal presence. Those polarization modulations may be applied additionally to phase modulations, or as an alternative for phase modulations.

Applying the phase and/or polarization modulations in a deterministic way, i.e. according to a predefined pattern, has the advantage that an ideal reference is provided to coherent receivers 102 for keeping their equalizer up-to-date. Preferably, the 'ones' are deterministically phase-modulated individually on both polarizations, but synchronously intensity modulated with the same NRZ-OOK bit stream, such that the transmitted optical power remains sufficiently high. In the example of 4-QAM (Quadrature Amplitude Modulation) or QPSK (Quadrature Phase-Shift Keying), and two polarizations, there are 16 possible combinations. In an example embodiment, the same pattern may therefore be repeated every 16 symbols. In this, the counter may be increased on every symbol, or only on symbols on which an NRZ-OOK 'one' value is modulated. In another embodiment, a scrambling pattern may be applied, where phase modulation is applied pseudorandomly, i.e., still deterministically but appearing random-like due to a much longer repetition cycle. Such cycles may be generated at both the transmitter and the receiver side using linear feedback shift registers, initialized with a known seed, e.g., PON superframe counter, similarly to PON scramblers.

Figure 4:
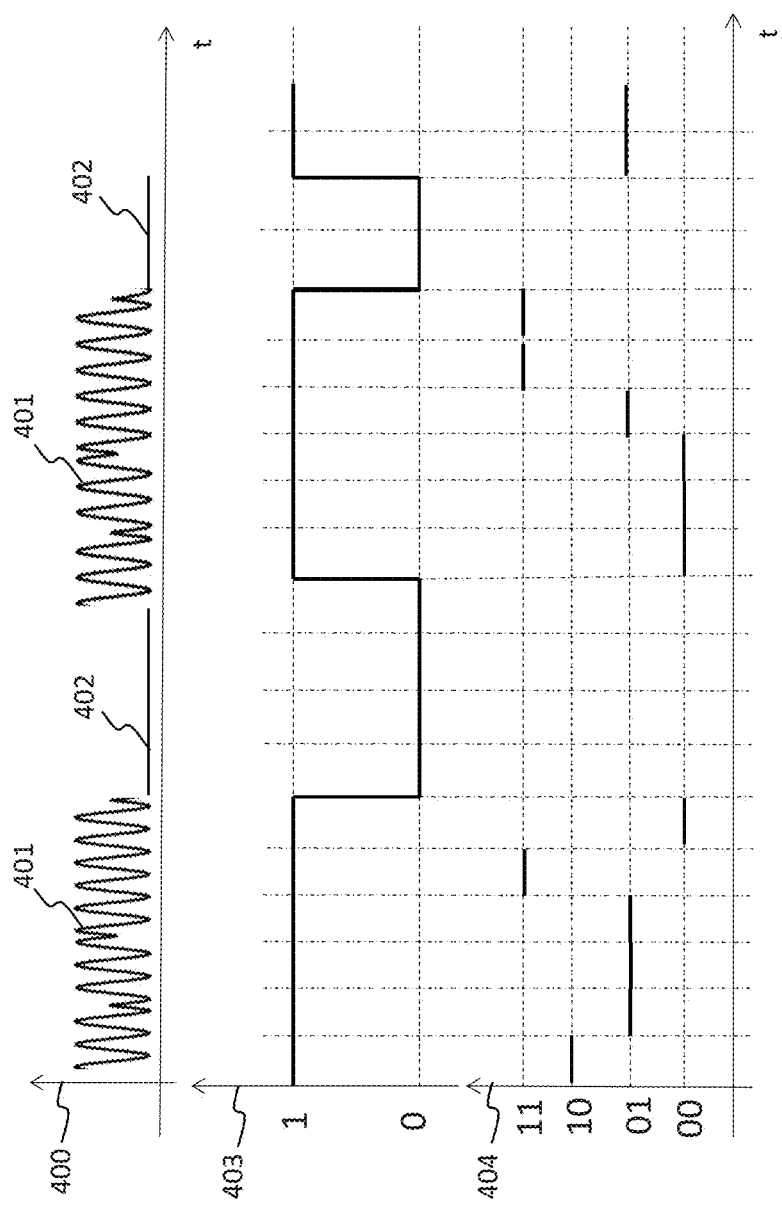

FIG. 4 schematically illustrates a modulation scheme implemented by the first module 201, according to another example embodiment of the apparatus 200. FIG. 4 shows the time evolution of a modulated optical signal 400, encoded information 403 for optical receivers of the first type 101, and encoded information 404 for optical receivers of the second type 102.

In the example embodiment of FIG. 4, data intended for receivers of the first type 101 is encoded into the optical carrier wave by means of an NRZ-OOK modulation (Non-Return-to-Zero On-Off Keying). Similar to the example embodiment of FIG. 3, in some periods the signal is present, see 401, while in other periods the signal is not present, see 402. During operation, an optical receiver of the first type 101, adapted for intensity detection, will receive the modulated signal 400 and decode the transferred digital data, see the bit values illustrated in 403. A traditional DD receiver of the first type 101 may be used for this.

Furthermore, the example embodiment of FIG. 4 shows that during the periods of time where a modulated signal 400 is present, the phase of the signal is modulated. In the example of FIG. 4, four different phase conditions may be applied to the carrier wave, such that four different symbols may be represented by means of the phase modulations, see 304. Different from FIG. 3, in FIG. 4 the phase modulations are not applied according to a predefined pattern, but are applied such that data intended for receivers of the second type 102 is represented by the phase modulations. In the illustration of FIG. 4, a bit stream '10' '01' '01' '01' '11' '00' etc., is transferred to receivers of the second type 102 during a period of time where a bit stream '1' '1' '1' '1' '1' '1' is transferred to receivers of the first type 101. Including the phase variations in the modulated signal allows to keep the equalizers up-to-date, but the example embodiment of FIG. 4 has the additional advantage that an increased capacity is obtained on the system level.

As an alternative to, or additionally to phase modulations, the polarization of the carrier wave may be modulated during signal presence. In the example that data is continuously conveyed to a coherent receiver 102 and an DD receiver 101, the system capacity would amount up to C_IM+½ C_Coh, where C_IM is the capacity if only IM-DD is used, e.g. 50 Gbps for 50 Gbaud NRZ, and C_Coh is the capacity if only coherent transmission is used, e.g. 200 Gbps for 50 Gbaud coherent with QPSK phase modulation and dual-polarization use. In the numeric example, the system capacity would be 150 Gbps. In other words, by use of the first module of the apparatus, 100 Gbps of capacity is added, without compromising on the 50 Gbps underlying IM-DD capacity. This is important, because those DD receivers may already be installed, and are linked with particular service level agreements that may rely on the full C_IM to be available.

In the example embodiments of the first module 201 illustrated in FIG. 3 and FIG. 4, an NRZ-OOK modulation is used for encoding data intended for the first type of receivers 101. Other example embodiments are possible however, wherein the intensity of the carrier wave is varied in another way for encoding data intended for the first type of receivers 101. For example, an intensity modulation may be used in which different power levels are modulated. Accordingly, phase and/or polarization may e.g. be applied during periods in which the intensity modulated signal is present, or e.g. during periods wherein a specific power level of the intensity modulated signal is present. Finally, in various embodiments, generating an intensity modulated signal at the transmitter may be done in different ways, e.g. the amplitude or power may be controlled.

Figure 5:
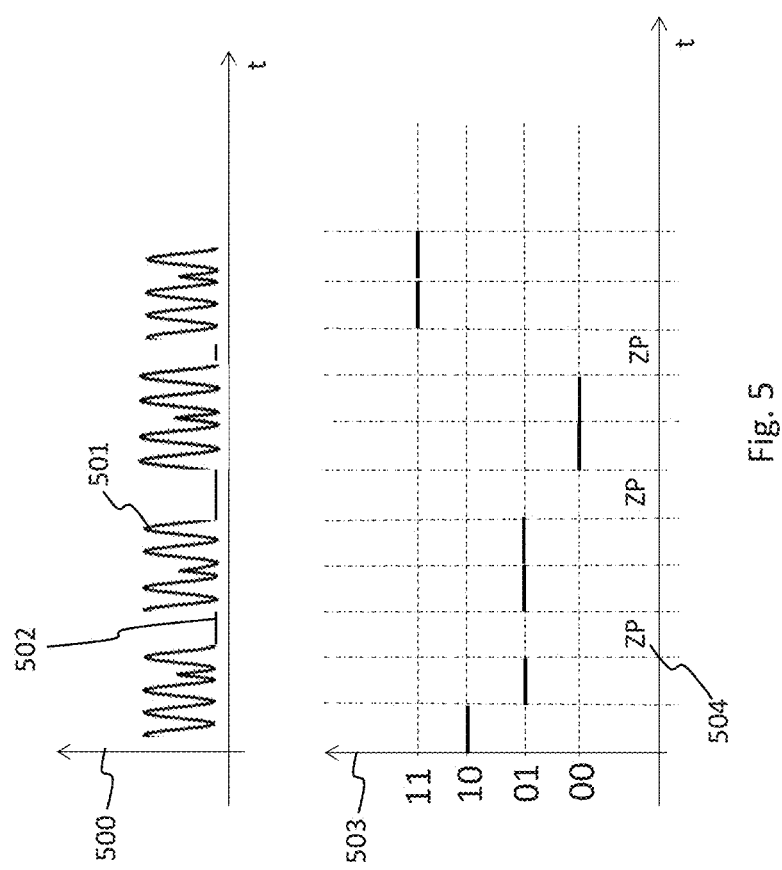
FIG. 5 and FIG. 6 each schematically illustrate a modulation scheme implemented by a second module of an example embodiment of an apparatus for signal modulation in a point-to-multipoint optical network.

FIG. 5 schematically illustrates a modulation scheme implemented by the second module 202 of an example embodiment of the apparatus 200. FIG. 5 shows the time evolution of a modulated optical signal 500. A period of time is represented in which data intended for receivers of the second type 102 is transferred over the optical network 100. In the example embodiment of FIG. 5, phase modulations are used to encode data intended for receivers of the second type 102 into the optical carrier wave, see 501. Four different phase conditions are used, resulting in four symbols '00', '01', '10' and '11'. In the example of FIG. 5, a bitstream 503 is transferred to receivers of the second type 102, comprising '10', '01', '01', '01', '00', '00', '11', '11'. As receivers of the second type 102 are adapted for optical field detection, they may detect the phase variations in the modulated signal 500, and extract the encoded data. Additionally or alternatively to phase modulations, the polarization of the optical wave may be modulated.

Figure 7:
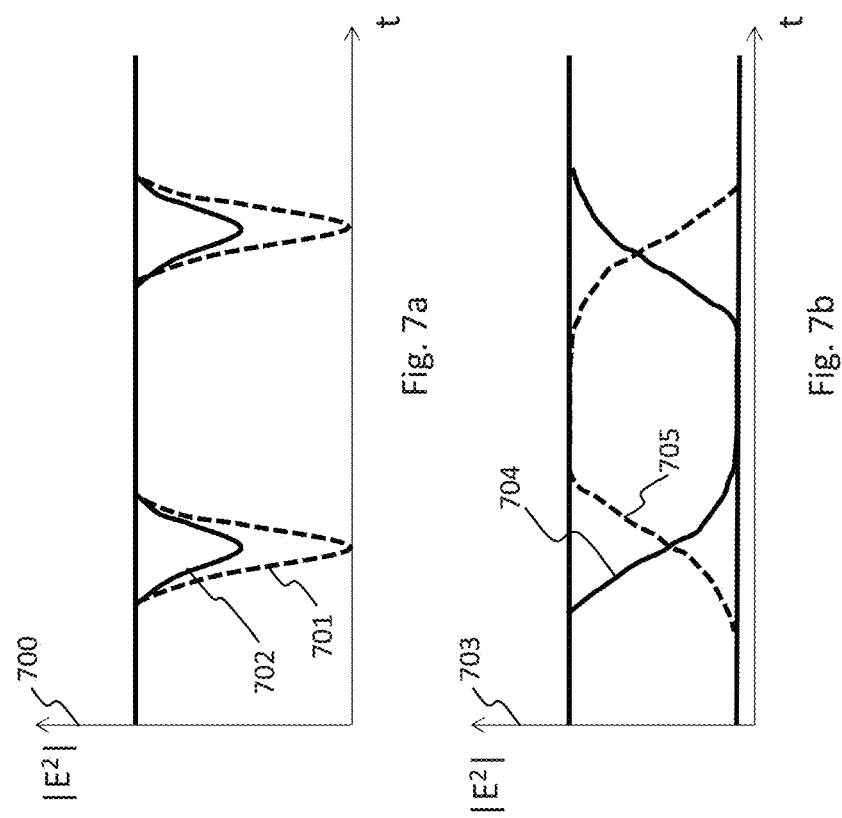
FIG. 7a illustrates an eye diagram according to a signal modulated with a classical QPSK (Quadratic Phase Shift Keying) scheme.
FIG. 7b illustrates an eye diagram according to a signal modulated with a traditional an NRZ-OOK (Non-Return-to-Zero On-Off Keying) scheme.

Furthermore, FIG. 5 shows that periods of zero power, see 504 and 502, are introduced in the modulated signal 500. This has the advantage that the CDR (Clock and Data Recovery) of the first type of receivers 101 stays locked while transferring data intended for the second type of receivers 102. Indeed, FIG. 7b illustrates an eye diagram corresponding to what a traditional DD receiver expects when receiving an NRZ-OOK modulated signal. The available transitions between 'high' power and 'low' power typically allow a CDR component to phase-align the clock and therefore converge to a locked condition. However, as is illustrated by the eye diagram of FIG. 7a, when using a classical QPSK for coherently modulating a signal, no zero-level is present for the duration of a symbol. Consequently, e.g. a bang-bang phase detection (BB-PD) CDR implementation is not guaranteed to stay locked under reception of a classically QPSK modulated signal. For an NRZ modulated signal, such BB-PD is characterized by a single threshold that, when crossed, will trigger the CDR to be updated. Multiple alternative CDR implementations exists, such as the Mueller-Müller scheme for timing recovery, which generally make assumptions on the shape of the modulated signal. By regularly modulating zero simultaneously, preferably on both polarizations, as is illustrated with 504 and 502 in FIG. 5, the eye diagram will look more like an NRZ signal, such that the threshold of a bang-bang phase detector is crossed on a regular basis. This ensures that a CDR of a first type of receiver 201 stays locked.

In the example embodiment of FIG. 5, the zero-power symbols 504 are periodically inserted, with an occurrence sufficient to ensure that the CDR remains locked. If, in a numerical example, ⅛ of such symbols need to be zero-power, then this allows the system capacity to be increased to ⅞ C_Coh during periods of time wherein only data intended for the second type of receivers 102 is to be transferred. In the assumption of an AC-coupled DD receiver, the fraction of zero-power symbols needs to approach ½ by the end of the exclusive coherent transfer, such that the AC-based zero-crossing is at the right point by the time data transfer intended for the first type of receivers 101 resumes. For receivers of the first type 101, the DC filtering is often such that the CDR is immune to a number of Consecutive Identical Digits (CID). Mandated values for CID may be used to determine the amount of zero-power symbols to be inserted.

In the example embodiment of FIG. 5, the periods of zero power 504 are introduced at a constant rate. In another embodiment, a variable rate may be applied. If data intended for the first type of receivers 101 will be transferred in the near future, zero-power symbols 504 may be inserted at a high rate to ensure the CDRs of the first type of receivers 101 being locked sufficiently accurately by the time they need to extract data again. On the other hand, if no data will be transferred to the first type of receivers 101 in the near future, a low rate of zero-power symbols may be used, thereby reaching a higher data rate towards the second type of receivers 102.

Figure 6:
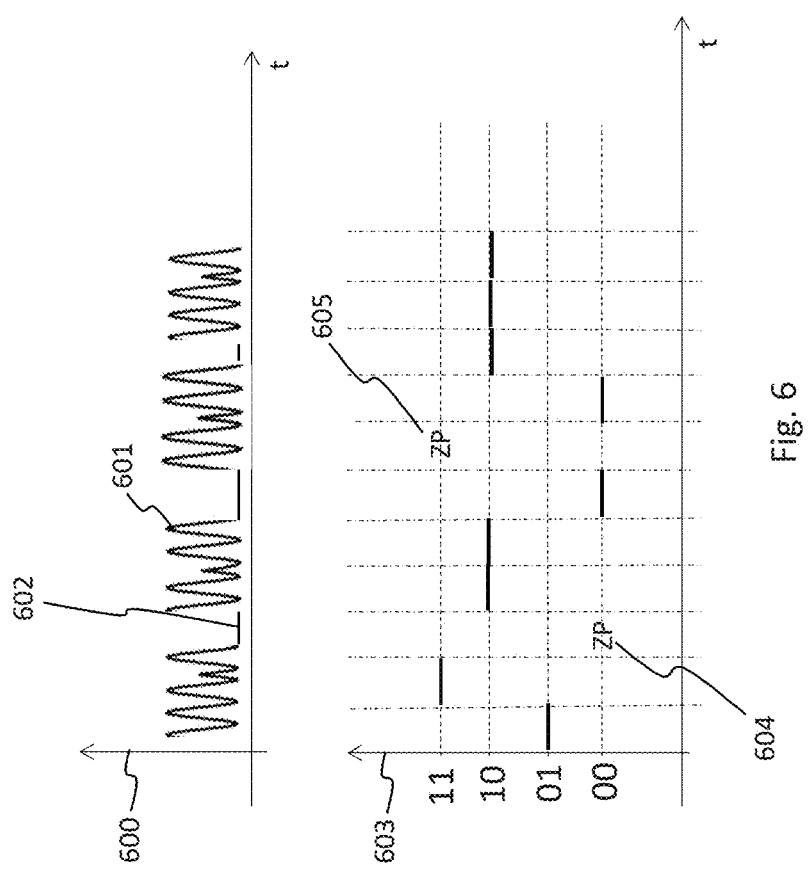

FIG. 6 schematically illustrates a modulation scheme implemented by the second module 202 of another example embodiment of the apparatus 200. FIG. 6 shows the time evolution of a modulated optical signal 600. A period of time is represented in which data intended for receivers of the second type 102 is transferred over the optical network 100. In the example embodiment of FIG. 6, phase modulations are used to encode data intended for receivers of the second type 102 into the optical carrier wave, see 601. Similar to FIG. 5, four different phase conditions are used, and a bitstream 603 is transferred to receivers of the second type 102. Additionally or alternatively to phase modulations, the polarization of the optical wave may be modulated.

Furthermore, FIG. 6 shows that periods of zero power, see 604, 605 and 602, are introduced in the modulated signal 600. Just like for the example embodiment of FIG. 5, this has the advantage that the CDR of the first type of receivers 101 stays locked while transferring data intended for the second type of receivers 102. However, different from the example of FIG. 5, the periods of zero power 604, 605 are now modulated such that they represent data intended for receivers of the second type 102. Modulating data on the zero-power period may be done in multiple ways. In the example embodiment of FIG. 5, periods of zero power are introduced based on occurring transitions between symbols in data intended for the second type of receivers 102. In particular, the zero-power periods are introduced such that transitions between constellation points in a constellation diagram do not cross the origin of the constellation diagram. This is illustrated in FIG. 7 to FIG. 10.

FIG. 8 shows a constellation diagram of a classical QPSK modulation scheme, wherein the condition of the in-phase wave (I-wave) is represented on the horizontal axis 803, and the condition of the quadrature wave (Q-wave) is represented on the vertical axis 802. The constellation points 801, 811, 800, 810 each represent a unique combination of amplitude and phase of the I- and Q-wave, corresponding to the symbols '01', '11', '00', '10' respectively. FIG. 8 schematically shows a transition 805 between constellation point 811 and 800, lying in opposing quadrants, and the transition 804 crossing the origin of the constellation diagram. Correspondingly, the transition 701 is represented in the eye diagram of FIG. 7a. Similarly, a transition 804 between constellation points 811 and 801 is shown in the constellation diagram of FIG. 8, corresponding with the line 702 in the eye diagram of FIG. 7a.

FIG. 9 shows that data is modulated on a zero-power period by expanding the classical constellation diagram of FIG. 8 into a modified constellation diagram with five points. The zero-power period represents an additional point 900 in the constellation diagram. Moreover, zero-power is modulated whenever the intended constellation point corresponding to the current bit value is in the opposite quadrant of the constellation point corresponding to the previous bit value. FIG. 9 (right) illustrates that in this way a transition 805 in the classical constellation diagram is replaced with a transition 901, thereby avoiding crossing of the origin. For example, if in the data intended for a second type of receiver 102 a bit pattern occurs like '11' '00', this will be modulated by a modulation corresponding with point 811, followed by a zero-power period. This is further illustrated in FIG. 10, wherein the various transitions starting from constellation point 801 are shown.

In this way, transitions 701 will no longer be present in the eye diagram of FIG. 7a. Instead, they are replaced with a transition towards a zero-power period, as is illustrated with the zero-power periods 604 and 605. Other transitions like 702 remain unchanged in the eye diagram of FIG. 7a. When a receiver of the first type 101 receives the modulated signal 600, a transition from e.g. '11' followed by a zero-power period is similar to a transition from 'high' to 'low' power which the CDR expects, see the eye diagram of FIG. 7b. Therefore, a CDR may phase-align his clock accordingly, and thus remain in a locked condition. On the other hand, a transition like 702 is clearly different from what a CDR of a DD receiver would expect, such that it will less likely get a false positive trigger. In this way, CDR locking is optimally guaranteed, and during periods of time where exclusively data intended for the second type of receivers is transferred, the full inherent capacity C_Coh is used.

The encoding into zero-power may be done on a single polarization, independently from the constellation point on the other polarization, or only when such transition would occur on both polarizations concurrently. Per polarization, the likelihood for sending zero-power is ¼, or ¹⁄₁₆ over the two polarizations. Other example modulation formats exist. Another example modulation format which uses the zero-power origin as a constellation point is where two bits are mapped onto the following four constellation points in polar coordinates $\{(0,0), (1,0), (1,2pi/3), (1,4pi/3)\}$.

Various embodiments are possible for modulating data on the zero-power period, e.g. the zero-power constellation point may always represent the same bit value, the bit value corresponding to the zero-power constellation point may depend on the previous constellation point, etc. Moreover, the zero-power level may be inherent to the modulation format, i.e. the zero-power symbol is part of the constellation points defining the phase/polarization modulation scheme applied to encode the data intended for the second type of receivers, as is e.g. the case for a duo-QPSK modulation scheme. Furthermore, embodiments are possible wherein zero-power periods are introduced for representing data, combined with a periodic introduction of zero-power periods, thereby having more control on the occurrence of zero-power periods in the modulated signal.

In the example embodiments of the second module 202 illustrated in FIG. 5 and FIG. 6, periods of zero power are introduced into the modulated signal to ensure CDR locking. Other example embodiments are possible however, wherein phase and/or polarization modulations are used to encode data intended for the second type of receivers, and some type of intensity modulation is additionally applied in order to ensure CDR locking. For example, an intensity modulation may be used in which different power levels are modulated. Specific power levels may be introduced periodically, or may be used to modulate data. Finally, in an embodiment, a modulation scheme may be used to encode data intended for the second type of receivers 102 in which amplitude modulations are applied next to phase and/or polarization modulations.

Referring to FIG. 2, the first module 201 may be configured to modulate the carrier wave 204 by means of a modulation scheme as illustrated in FIG. 3, where the phase and/or polarization modulations are applied according to a predefined pattern, and the second module 202 may be configured to modulate the carrier wave 204 by means of a modulation scheme as illustrated in FIG. 5 or FIG. 6. If within a specific timeslot data intended for the second type of receivers needs to be transferred, then the processing unit 206 will instruct to use the second module to modulate the carrier wave. If data intended for the first type of receivers need to be transferred, processing unit 206 will instruct to use the first module to modulate the carrier wave.

In another embodiment, the first module 201 may be configured to modulate the carrier wave 204 by means of a modulation scheme as illustrated in FIG. 4, where coherent data is modulated by means of the phase and/or polarization modulations, and the second module 202 may be configured to modulate the carrier wave 204 by means of a modulation scheme as illustrated in FIG. 5 or FIG. 6. If within a specific timeslot only data intended for the second type of receivers needs to be transferred, then the processing unit 206 will instruct to use the second module to modulate the carrier wave. If only data intended for the first type of receivers need to be transferred, processing unit 206 will instruct to use the first module to modulate the carrier wave. On the other hand, if data intended for both the first and second type of receivers needs to be transferred, processing unit 206 will instruct to use the first module, as the modulation scheme of FIG. 4 allows to modulate data intended for both the first and second type of receivers.

In this way, the apparatus 200 allows for a co-existence of high-tier coherent receivers 102 and traditional low-cost DD receivers 101 on the same wavelength. Therefore, it is not required to replace all legacy already-installed receivers, a capacity increase is obtained compared to a traditional PON, and disadvantages due to spectrum scarcity in the O-band are avoided.

Remark that FIGS. 3 to 6 were used to illustrate the functioning of a modulation scheme. They have to be interpreted as a schematic representation only, without the intention to show an exact representation of a modulated carrier wave. Moreover, 'zero power' refers to the intention of limiting the power to a level being close to zero; in practice there may be some very small residual power present. Furthermore, although FIG. 3 and FIG. 4 show the same symbol rate for each type of encoded information, in general, the symbol rate of the encoded data intended for the first type of receivers 101 may differ from the symbol rate of the data transferred to the second type of receivers 102.

Also remark that although the modulation schemes were explained as to be used for modulating upstream data, i.e. from an OLT 103 towards receivers 101, 102, similar features could be used in a scheme for modulating downstream data.

Figure 11B:
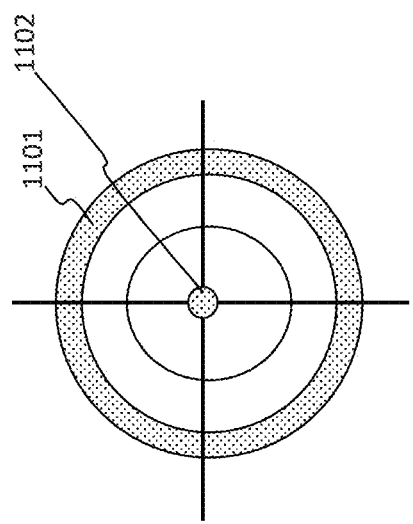
FIGS. 11a and 11b schematically illustrate possible implications on a receiver of the second type when an example embodiment of an apparatus is used for signal modulation.
Figure 11A:
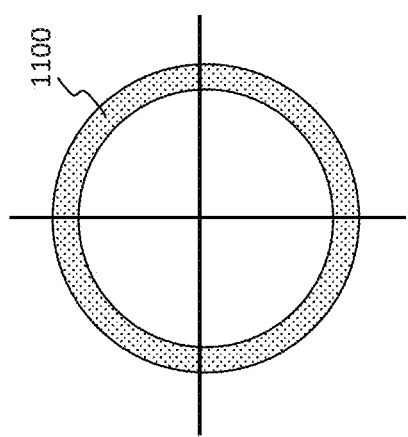

Finally, FIGS. 11a and 11b illustrate possible implications on a coherent receiver 101 when the apparatus 200 is used for signal modulation. Indeed, referring to the second module 202 and the schemes illustrated in FIGS. 5 and 6, a coherent receiver 101 needs to be adapted to accommodate the modulation of zeros. In case a Constant Modulus Algorithm (CMA) is used for equalization, for a QPSK receiver 101, the CMA algorithm will ensure that the received signal amplitude is equalized or normalized to the unit circle, see FIG. 11a. In case periods of zero power are introduced, an unadapted CMA would lead to a biased estimator. The CMA may e.g. be adapted to a Multi-modus Algorithm (MMA) for equalization, further characterized in that the equalizer is not updated in case the received power is below a threshold. This threshold may be based on the expected extinction ratio of the receiver, or based on a minimum SNR required for the particular application.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. Apparatus for signal modulation in a point-to-multipoint optical network, said apparatus being configured to modulate a single-wavelength carrier wave before distribution towards optical receivers of a first type adapted for intensity detection and a second type adapted for optical field detection, said apparatus comprising:
  a first module configured to modulate said carrier wave
    by varying the intensity of said carrier wave, to represent data intended for said first type of receivers, and
    by controlling the phase and/or polarization of said carrier wave during selected periods;
  a second module configured to modulate said carrier wave
    by varying the phase and/or polarization of said carrier wave, to represent data intended for said second type of receivers, and
    by varying the intensity of said carrier wave during selected periods.

2. Apparatus according to claim 1,
  wherein said first module is configured to modulate said carrier wave by controlling said phase and/or polarization during periods wherein said carrier wave is present.

3. Apparatus according to claim 2,
wherein said first module is configured to vary the intensity of said carrier wave by means of an on-off modulation.

4. Apparatus according to claim 1,
wherein said first module is configured to modulate said carrier wave by controlling said phase and/or said polarization according to a predefined pattern.

5. Apparatus according to claim 1,
wherein said first module is configured to modulate said carrier wave by controlling said phase and/or said polarization, to represent data intended for said second type of receivers.

6. Apparatus according to claim 1,
wherein said second module is configured to vary the intensity of said carrier wave by introducing periods of zero power.

7. Apparatus according to claim 6,
wherein said second module is configured to introduce said periods of zero power periodically, at a constant or variable rate.

8. Apparatus according to claim 6,
wherein said second module is configured to introduce said periods of zero power, to represent data intended for said second type of receivers.

9. Apparatus according to claim 8,
wherein said second module is configured to introduce said periods of zero power based on occurring transitions between intended symbols in said data intended for said second type of receivers.

10. Apparatus according to claim 9,
wherein said second module is configured to vary said phase and/or said polarization of said carrier wave based on a modulation scheme characterised by points in a constellation diagram, said periods of zero power representing an additional point in said constellation diagram, and wherein said second module is configured to introduce said periods of zero power such that transitions between points in said constellation diagram do not cross the origin of said constellation diagram.

11. Apparatus according to claim 1,
wherein said apparatus is configured to receive slot allocation information, representing the intended one or more receivers in a timeslot, and is configured to select said first or said second module for modulating said carrier wave during said timeslot, based on the type of said one or more intended receivers in said timeslot.

12. System comprising:
an apparatus according to claim 1;
one or more optical receivers of said first type;
one or more optical receivers of said second type;
a point-to-multipoint optical network comprising optical fibres configured to distribute a modulated optical signal from said apparatus towards said optical receivers.

13. System according to claim 12,
wherein said optical receivers of said second type comprise an equalizer configured to reverse distortions incurred by said modulated optical signal due to fibre impairments, and wherein said equalizer is configured to do an adaptive equalization of an optical signal modulated with said second module such that said adaptive equalization is not updated when the received power is below a selected threshold.

14. Method for signal modulation in a point-to-multipoint optical network comprising:
providing optical receivers of a first type adapted for intensity detection and a second type adapted for optical field detection;
providing an apparatus configured to modulate a single-wavelength carrier wave before distribution towards said optical receivers, said apparatus comprising a first module and a second module;
modulating said carrier wave using said first module, including,
varying the intensity of said carrier wave, to represent data intended for said first type of receivers, and
controlling the phase and/or polarization of said carrier wave during selected periods;
modulating said carrier wave using said second module, comprising:
varying the phase and/or polarization of said carrier wave, to represent data intended for said second type of receivers, and
varying the intensity of said carrier wave during selected periods.

15. A non-transitory computer readable medium storing computer-executable instructions, which when executed cause a device to perform at least the following:
providing optical receivers of a first type adapted for intensity detection and a second type adapted for optical field detection;
providing an apparatus configured to modulate a single-wavelength carrier wave before distribution towards said optical receivers, said apparatus comprising a first module and a second module;
modulating said carrier wave using said first module, comprising:
varying the intensity of said carrier wave, to represent data intended for said first type of receivers, and
controlling the phase and/or polarization of said carrier wave during selected periods;
modulating said carrier wave using said second module, comprising:
varying the phase and/or polarization of said carrier wave, to represent data intended for said second type of receivers, and
varying the intensity of said carrier wave during selected periods.

* * * * *

UNITED STATES PATENT AND TRADEMARK OFFICE
CERTIFICATE OF CORRECTION

PATENT NO. : 11,265,083 B2
APPLICATION NO. : 17/136809
DATED : March 1, 2022
INVENTOR(S) : Jochen Maes et al.

It is certified that error appears in the above-identified patent and that said Letters Patent is hereby corrected as shown below:

On the Title Page

Item (73) insert --(73) Assignee: Nokia Solutions and Networks Oy
Espoo, (FI)--

Signed and Sealed this
Twenty-eighth Day of March, 2023

Katherine Kelly Vidal
*Director of the United States Patent and Trademark Office*